United States Patent [19]

Weelink

[11] Patent Number: 4,829,937
[45] Date of Patent: May 16, 1989

[54] DEVICE FOR ACCOMMODATING AN ANIMAL TO BE TENDED

[76] Inventor: Johannes M. W. Weelink, No. 10, Brandersdijk, Zieuwent, Netherlands

[21] Appl. No.: 442,200
[22] PCT Filed: Mar. 18, 1982
[86] PCT No.: PCT/NL82/00008
§ 371 Date: Nov. 10, 1982
§ 102(e) Date: Nov. 10, 1982
[87] PCT Pub. No.: WO82/03153
PCT Pub. Date: Sep. 30, 1982

[30] Foreign Application Priority Data

Mar. 18, 1981 [NL] Netherlands ............... 8101333

[51] Int. Cl.⁴ .................................................. A61D 3/00
[52] U.S. Cl. .................................................. 119/102
[58] Field of Search ................... 119/99, 100, 101, 102

[56] References Cited

U.S. PATENT DOCUMENTS

| 367,305 | 7/1887 | Leech | 119/101 |
| 803,600 | 11/1905 | Kendall | 119/101 |
| 878,347 | 2/1908 | Clement | 119/101 |
| 2,672,126 | 3/1954 | Linton | 119/100 |
| 2,909,153 | 10/1959 | McKinley et al. | 119/100 |
| 3,058,447 | 10/1962 | Neuenschwander | 119/96 |
| 4,055,148 | 10/1977 | Brockman et al. | 119/103 |
| 4,183,326 | 1/1980 | Wills | 119/96 |
| 4,185,591 | 1/1980 | Patelis | 119/102 X |

FOREIGN PATENT DOCUMENTS

| 1175484 | 8/1964 | Fed. Rep. of Germany . | |
| 2017155 | 10/1971 | Fed. Rep. of Germany . | |
| 2355578 | 5/1975 | Fed. Rep. of Germany | 119/102 |
| 901819 | 8/1945 | France . | |
| 1463504 | 11/1966 | France . | |
| 1225898 | 3/1971 | United Kingdom . | |

Primary Examiner—Robert P. Swiatek
Attorney, Agent, or Firm—John P. Snyder

[57] ABSTRACT

A device for accommodating an animal to be tended, particularly a cow, comprising a frame formed by relatively spaced lateral frame parts and a frame part interconnecting the former, the lateral frame parts bounding an accommodation space open at least to the front and the underside for receiving the animal and furthermore comprising supporting members connected with the frame for supporting the animal with respect to the frame, the supporting members comprising a belly-strap and back supporting elements coming into contact with the animal's back.

19 Claims, 1 Drawing Sheet

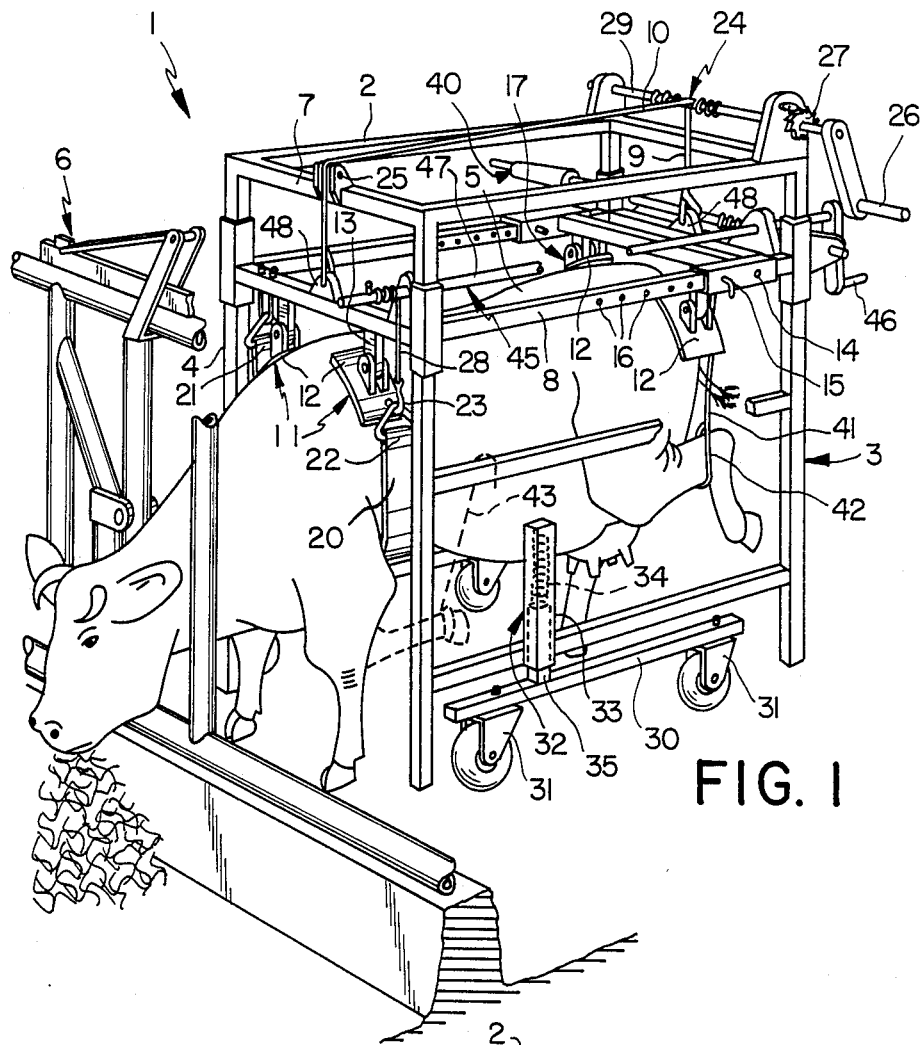
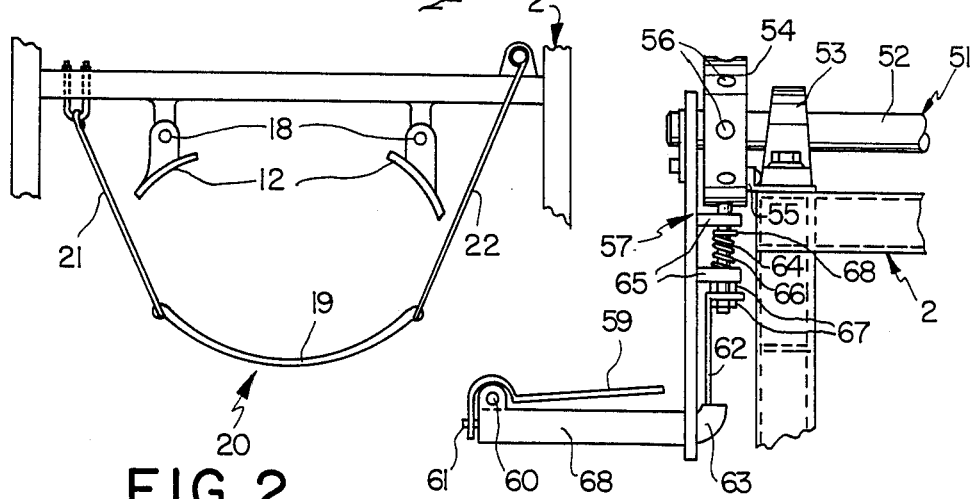

DEVICE FOR ACCOMMODATING AN ANIMAL TO BE TENDED

The invention relates to a device for accommodating an animal to be tended, particularly a cow, comprising a frame formed by relatively spaced lateral frame parts and a frame part interconnecting the former, the lateral frame parts bounding an accommodation space open at least to the front and the underside for receiving the animal and furthermore comprising supporting means connected with the frame for supporting the animal with respect to the frame, said supporting means comprising a belly-strap.

Such a device is known from German patent application No. 2,017,155 and is employed, for example, for trimming the hooves of a cow. Cutting the hooves has to be done every half year. The device is positioned around the cow and by the supporting means the cow is held in place with respect to the frame so that the hooves can be readily tended. In this known device the supporting means are formed by a belly-strap secured to the forward end of the device. An animal held in this device is still capable of slightly moving laterally with respect to the frame.

The invention has for its object to provide a device of the kind set forth in the preamble, in which the animal can be better supported with respect to the frame.

This is achieved by a device in which the supporting means comprise back supporting means coming into contact with the animal's back. Thus the animal is completely fixed in place with respect to the frame of the device so that it is held substantially immovable with respect to the device.

Preferably the strap is secured to the forward end of the frame and the supporting means furthermore comprise a withers support positioned above said strap.

When in accordance with the invention the belly-strap is rigidly secured by one of its ends to the frame and it is engaged at the other end by a lifting device mounted on the frame, the animal can be firmly held in contact with the withers support in the device, by actuating the lifting device.

In an effective embodiment the lifting device is formed by a hand winch. The hand winch preferably comprises a crank immovably coupled with the frame by a pawl device normally held in engagement by spring means, whilst unlocking means of the pawl device are arranged on the crank handle. It is thus ensured that the lifting device is invariably locked when the handle is not touched. Consequently, when one lets go of the handle, the lifting device is immediately locked. Thus, injuries of the animal being tended and of the operator are effectively avoided. If the lifting device were released too rapidly the animal might lose its balance and be injured and a rapidly rotating crank might injure the operator.

When in accordance with the invention the back supporting means comprise supporting plates pivoted to the frame, they can join the back of the animal to be tended with satisfactory fit. Thus the supporting effect will be optimal. In order to enhance the stability the strap may comprise a rigid portion, for example, a plate portion.

In an advantageous embodiment of the invention a wheel frame is connected with each lateral frame part through a spring system, which spring system engages the frame in a manner such that the working line of the force resulting from the weight of the device and the forces exerted in operation on the supporting means substantially coincides with the working line of the reactive force exerted by the spring system on the frame. It is thus ensured that when the strap is tightened by means of the lifting device the frame is substantially perpendicularly drawn downwards until it gets into contact with the ground.

Further features and advantages of the invention will become apparent from the following description of an embodiment thereof with reference to the accompanying drawings.

FIG. 1 is a perspective view partly broken away of a device embodying the invention in the operational state.

FIG. 2 is a partial front view of the device constituting a preferred embodiment of the invention.

FIG. 3 shows a detail of a preferred embodiment of the device in accordance with the invention.

The device 1 embodying the invention comprises a frame 2 formed by a left-hand lateral frame part 3, a right-hand lateral frame part 4 and transverse beams 7 interconnecting said lateral frame parts 3, 4. The frame is mobile on wheels 31 and it can be straddled over a cow 5 fixed by its head in a holdfast 6 of known type.

According to the invention the device 1 comprises back supporting means mounted on a back supporting frame 8. The back supporting frame 8 is mounted on the frame 2 so as to be adjustable in a direction of height. The height can be set with the aid of a lifting device 24 mounted on the frame. Cords 9, 10 are fastened to supports 48 of the back supporting frame and pass to a winding shaft 29 of the lifting device provided with a crank 26. The cord 10 passes over a pulley 25. The winding shaft 29 is engaged by a pawl mechanism 27, which ensures that forces can be passed through the cords 9, 10 to the frame. In this embodiment the back supporting means comprise a withers support 11 and a hind-quarters support 17. The hind-quarters support 17 is mounted on an auxiliary frame 14 arranged in longitudinal direction on the back supporting frame 8. The auxiliary frame 14 is adjustable in the correct position by means of guard pins 15 engaged in holes 16 of the back supporting frame 8. The hind-quarters support 17 and the withers support 11 are formed by plates 12 of a matching, curved shape. The plates 12 are pivoted to supports 13 so that they can be smoothly deposited on the back of the cow 5.

The adjustability in height by means of the lifting device 24 and the adjustability in length by means of the holes 16 and the guard pins 15 are desired to adapt the device to small animals such as calves or to large adult animals.

With the withers support 11 co-operates a strap 20, one end 21 of which is rigidly secured to the back supporting frame 8. The other end 22 of the strap 20 is engaged by a hook 23 of a lifting device 45. The hook 23 is fastened to a cord 28, which is fastened to a winding shaft 47 of the lifting device 45 provided with a crank 46. The winding shaft 47 is engaged by a pawl mechanism (not shown), which ensures that the cord 28 is held in the taut state.

According to the invention the wheels 31 are caster wheels so that the device 1 is readily maneuverable when straddling the cow 5. When it is necessary to run the device 1 across a grate floor, the wheels are preferably provided with pneumatic tyres. With each lateral frame part 3, 4 is connected a wheel frame 30 through a spring system 32, on which the caster wheels 31 are mounted. The spring system 32 comprises a spring sleeve 33 rigidly secured to the lateral frame part 3, 4 and having a spring 34. The wheel frame 30 is provided with a support 35, which is telescopically slidable in the spring sleeve 33 and is in contact at the top end with the lower end of the spring 34. At the top end the spring 34 is held in the spring sleeve 33. The wheels 31 are arranged symmetrically to the centre of gravity of the device 1 so that the device 1 can be displaced in a stable state. The spring system 32, however, is shifted to the front with respect to the centre of gravity of the device 1.

The device 1 is used in the following manner. The device 1 is run on the wheels 31 over the cow 5 fixed in the holdfast 6. The back supporting frame 8 and the auxiliary frame 14 are adjusted so that the withers support 11 and the hind-quarters support 17 are located at a slight distance above the back of the cow 5. Then the strap 20 is passed around the belly of the cow 5 and the hook 23 of the lifting device 45 is inserted into the end 22 of the strap 20. Subsequently the lifting device is tightened by turning the crank 46. By tightening the lifting device the frame of the device is drawn downwards by the reactive force. The spring system 32 is arranged on the frame in a manner such that the working line of the spring force coincides with the resultant of the weight of the device 1 and the reactive force on the back supporting frame. It is thus ensured that when actuating the lifting device 45 the device 1 is lowered in perpendicular position until the ends of the lateral frame parts 3, 4 come into contact with the floor. In this state the withers support 11 and, as the case may be, the hind-quarters support 17 are firmly pressed against the back of the cow 5 so that the cow is satisfactorily held in place in the device 1.

When the cow 5 is accommodated in this way in the device 1 for example, the animal's feet can be tended. To this end the frame is provided with a foot lifting device 40, by which the hind foot of the cow 5 can be lifted and held in the lifted position. The lifting device 40 comprises a cord 41, which is passed in a sling 42 around the animal's heel. In this manner the hooves of the cow 5 can be trimmed.

For trimming the fore-hoof of the cow 5 the front leg can be held in a lifted position with the aid of a hook 43. At the front of the lateral frame parts 3, 4 supports may be provided for deposition of a fore-hoof of the animal to be tended, the hoof being bound by a string.

FIG. 2 shows the strap and the withers supports located above the former in a preferred embodiment. The strap 20 comprises herein a rigid portion 19, which matches the shape of the belly of the animal to be tended. Together with the withers supports 12 pivotally fastened at 18 this preferred embodiment can ensure a particularly stable, tight clamp of the animal to be tended. Otherwise this embodiment is identical to that shown in FIG. 1, that is to say, the portion 21 of the strap 20 is rigidly secured to the frame 2 and the portion 22 is coupled with a hand winch (not shown).

In a preferred embodiment the hand winches are constructed so that they can only be turned when gripping the handle of the crank. This is desirable for reasons of safety in order to avoid that by an accidental release of the crank, the strap of a hind leg no longer being supported, the cow would get out of balance and fall down. The rapidly rotating hand crank would put the operator in danger.

FIG. 3 shows a possible embodiment of such a hand winch 51. The winding shaft 52 of the hand winch 51 is rotatably journalled on the frame 2 by means of bearings 53. Around an end of the winding shaft 51 protruding out of the bearing 53 is arranged a locking disc 54, which is rigidly secured to the frame 2 by means of a support 55. The winding shaft 52 extends freely rotatably through a central opening in the locking disc 54. A plurality of bores 56, for example, eight bores are provided in the periphery of the locking disc 54. To the end of the winding shaft 52 protruding outside the locking disc 54 is fastened a crank 57 having a handle 58. A pinching lever 59 is connected with the handle 58 by means of a pivotal joint 60. The pinching lever 59 comprises a short arm 61 to which a cable 62 is fastened. The cable 62 extends through the hollow handle 58 and through a guide bend 63 aligned to the handle 58. The other end of the cable 62 is clamped tight between two nuts 67 on a pin 64. The pin 64 is slidably mounted in two sliding supports 65 secured to the crank 57. Between the two sliding supports 65 the pin 64 has a shoulder 68, which is engaged by a spring 66. The other end of the spring 66 bears on the lower sliding support 65. Thus the pin 64 is loaded by the spring 66 in a direction towards the locking disc 54. The diameter of the pin 64 is such that it can readily snap into a bore 56 of the locking disc 54. The crank 57 and hence the winding shaft 52 can, therefore, not turn in the rest position of this hand winch, since the crank 57 is coupled with the frame 2 by the pin 64 held in a bore 56 of the locking disc 54. Only when the pinching lever 59 is pressed against the handle 58, the pin 64 is drawn via the cable 62 out of the hole 56 of the locking disc 54 so that the crank and hence the winding shaft 52 can be turned. When the handle 58 is intentionally or accidentally released, the spring 66 urges the pin 64 immediately into a bore 56 of the locking disc 54, the crank 57 being thus locked.

The hand winch 51 illustrated in FIG. 3 may be employed for the three winch functions illustrated in FIG. 1.

It will be obvious that the device embodying the invention may be constructed in a different manner than that shown and also that the self-locking winch of FIG. 3 may be devised differently.

I claim:

1. A device for accommodating an animal to be tended, particularly a cow, comprising a frame formed by relatively spaced lateral frame parts and a frame part interconnecting the former, the lateral frame parts bounding an accommodation space open at least to the front and the underside for receiving the animal and furthermore comprising supporting means connected with the frame for supporting the animal with respect to the frame, said supporting means comprising a belly-strap, characterized in that the supporting means comprise back supporting means coming into contact with the animal's back.

2. A device as claimed in claim 1, characterized in that the strap is arranged at the forward end of the frame and the supporting means furthermore comprise a withers support positioned above the same.

3. A device as claimed in claim 2, characterized in that at one of its ends the strap is rigidly secured to the frame and at the other end it is engaged by a lifting device mounted on the frame.

4. A device as claimed in claim 3, characterized in that the lifting device is formed by a hand winch.

5. A device as claimed in claim 4, characterized in that the hand winch comprises a crank immovably coupled with the frame by a pawl mechanism normally held in engagement by spring means and in that unlocking means of the pawl mechanism are arranged on the handle of the crank.

6. A device as claimed in any one of claims 1-5, characterized in that the back supporting means are carried by a back support frame part adjustable in a vertical position.

7. A device as claimed in claim 6, characterized in that the belly strap is mounted on the back support frame part.

8. A device as claimed in any one of claims 1-5, characterized in that the back supporting means comprise supporting plates pivoted to the frame.

9. A device as claimed in any one of claims 1-5, characterized in that a wheel carrying wheel frame is connected with each lateral frame part through a spring system, said spring system engaging the frame at a point shifted to the front with respect to the centre of gravity of the frame.

10. A device as claimed in claim 9, characterized in that the spring system engages the frame in a manner such that the working line of the force resulting from the weight of the device and the force exerted in operation on the supporting means substantially coincides with the working line of the reactive force exerted by the spring system on the frame.

11. A device as claimed in claim 10, characterized in that the wheel frame comprises two wheels arranged symmetrically to the centre of gravity of the frame and in that the spring system comprises a vertical spring sleeve connected with the frame, enclosing a spring and supporting the latter at its top end and a wheel frame support telescopically slidable in said sleeve and engaging the lower end of said spring.

12. A device as claimed in claim 9, characterized in that the wheels are caster wheels.

13. A device as claimed in any one of claims 1-5, characterized in that the belly-strap includes a rigid portion.

14. A device for supporting and stabilizing an animal such as a cow so that one of its legs may be lifted to expose a hoof for treatment, said device comprising a main frame adapted to straddle a standing animal, said main frame including a pair of spaced, lateral frame parts and a frame part interconnecting said lateral frame parts to define an inverted, generally U-shaped structure forming an accommodation space open at least at one end and at the bottom so as to receive an animal, a supporting frame vertically movable on said main frame and means for vertically adjusting said supporting frame relative to said main frame, said supporting frame including depending back engaging means for reacting downwardly onto an animal's back, and sling means carried by said supporting frame for forcing an animal's body upwardly so that said back engaging means bears downwardly against the animal's body to hold the animal substantially immovable with respect to the device.

15. A device as defined in claim 14 wherein said sling means comprises a belly strap connected at one end to said supporting frame and winch means carried by said supporting frame and connected to the other end of said belly strap for controlled clamping of the animal's body between said belly strap and said back engaging means.

16. A device as defined in claim 15 wherein said back engaging means includes a pair of withers plates pivotally connected to said supporting frame.

17. A device as defined in claim 16 wherein said back engaging means also includes a pair of hindquarter plates pivotally connected to said supporting frame.

18. A device for supporting and stabilizing an animal such as a cow so that one of its legs may be lifted to expose a hoof for treatment, said device comprising an inverted, generally U-shaped main frame means for bearing upon a supporting surface to form a solid base to stabilize an animal, a supporting frame vertically slidable on said main frame means but immovable in a horizontal plane with respect thereto, back engaging means carried by said supporting frame for bearing downwardly on the back of an animal, sling means carried by said supporting frame for clamping an animal's body upwardly against said back engaging means whereby an animal is substantially immobilized in a horizontal plane with respect to said main frame means, and winch means suspending said supporting frame from said frame means for limiting downward motion of said supporting frame and an animal's body relative to said frame means without constraining upward movement of the supporting frame relative thereto.

19. A device as defined in claim 18 wherein said back engaging means comprises a pair of withers plates pivotally suspended from said supporting frame and a pair of hindquarter plates pivotally suspended from said supporting frame, and means for fixedly positioning said hindquarter plates in different positions toward and away from said withers plates.

* * * * *